Feb. 14, 1961 R. C. DAVIS 2,971,220
METHOD FOR MANUFACTURING RUBBERIZED FABRIC ARTICLE
Original Filed Dec. 11, 1956 2 Sheets-Sheet 1
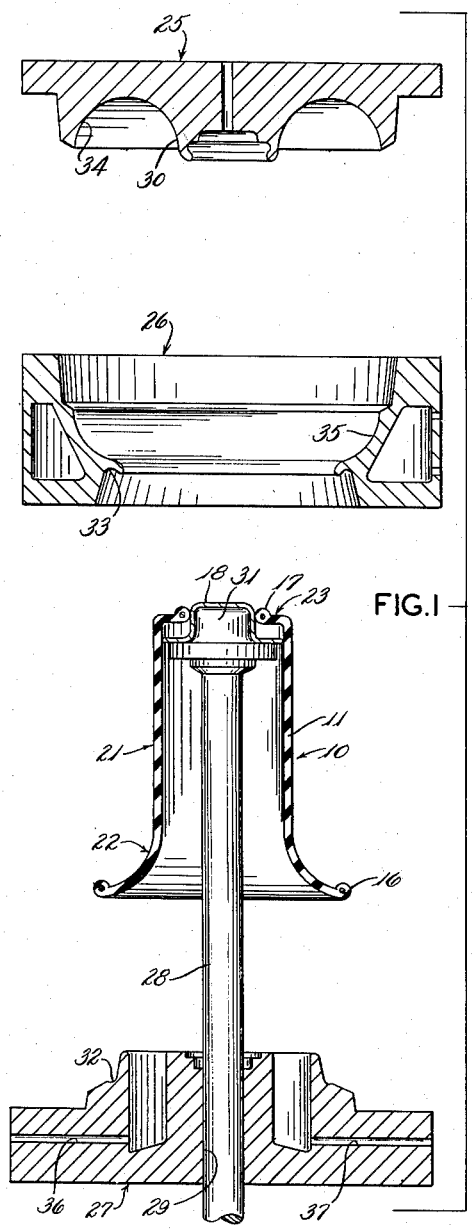
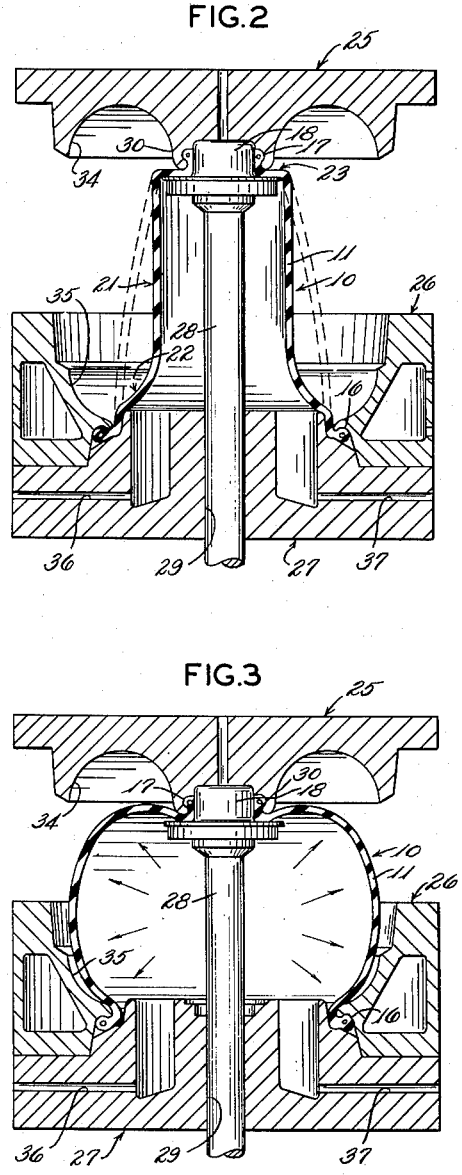
INVENTOR.
RALPH C. DAVIS
BY *W. A. Fraser*
ATTY.

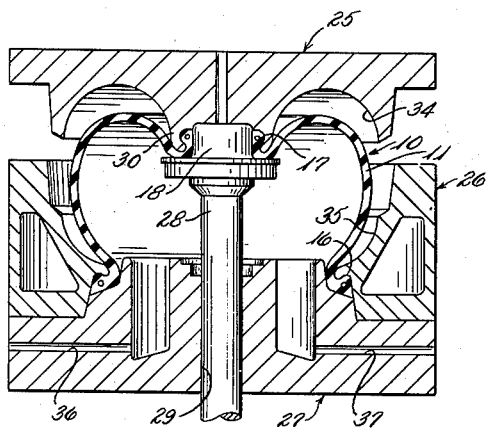
FIG. 4
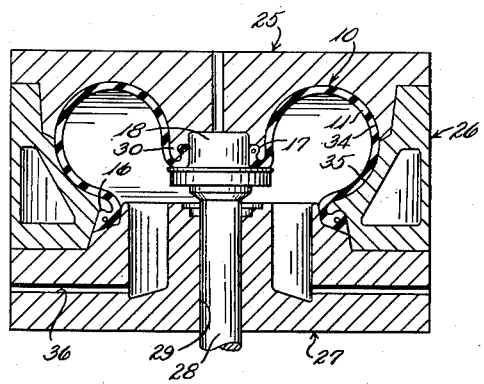
FIG. 5
FIG. 6
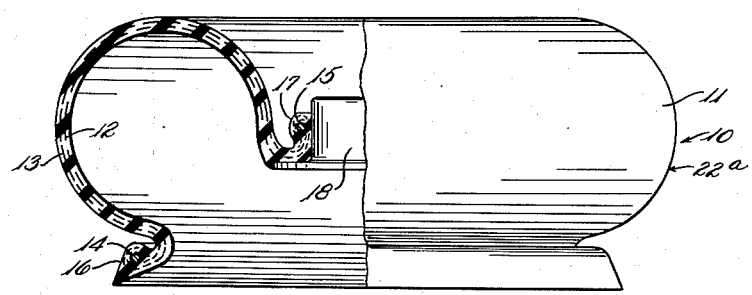
INVENTOR.
RALPH C. DAVIS
BY
ATTY.

United States Patent Office 2,971,220
Patented Feb. 14, 1961

2,971,220

METHOD FOR MANUFACTURING RUBBERIZED FABRIC ARTICLE

Ralph Charles Davis, Akron, Ohio, assignor to The Firestone Tire & Rubber Company, Akron, Ohio, a corporation of Ohio Original application Dec. 11, 1956, Ser. No. 627,580, now Patent No. 2,929,101, dated Mar. 22, 1960. Divided and this application June 20, 1958, Ser. No. 743,320

1 Claim. (Cl. 18—53)

This invention relates to air springs and more particularly to a method and apparatus for manufacturing air springs.

This application is a division of the co-pending application of Ralph C. Davis, Serial Number 627,580, now Patent No. 2,929,101, filed December 11, 1956.

The present invention is particularly useful in the manufacture of air springs of the telescoping type, i.e., air springs in which one of the beads is capable of passing into the body of the air spring in a telescoping movement. Such an air spring is conventionally manufactured by assembling a plurality of rubberized fabric plies on a building drum together with the appropriate innerliner and cover stock materials to form an unvulcanized air spring which has the form of a flaring tube which terminates at its ends in inextensible portions.

The unvulcanized air springs are then shaped and vulcanized in a mold which comprises separate sections which are moved apart to receive the unvulcanized air spring and which are then moved together in such a manner as to close about and proper shape the air spring. As the mold closes, the air spring is compressed so that it tends to collapse axially and as this axial compression takes place, air under pressure is introduced within the air spring to expand it radially. The manner in which the axial compression is coordinated with the radial inflation determines whether the air spring will be successfully molded. It is intended to take place in such a manner as to cause the air spring to shape itself to the mold contour without becoming pinched and without folding or wrinkling. However, if the radial expansion takes place too slowly, the axial collapse will cause the air spring to fold and buckle. On the other hand, if the radial expansion of the air spring occurs too rapidly with respect to the rate of axial compression, the air spring will bulge outwardly to excessively large diameters and it will tend to become pinched between the mold sections as they come together to close the mold. In either event, defective and faulty air springs will be produced.

As will be seen later, the difficulties in controlling the shaping operation are magnified by differences in the physical characteristics of the unvulcanized air springs which cause them to respond non-uniformly to the internal shaping pressures. For example, if two air springs of different characteristics are subjected to the same internal shaping pressure, one air spring may expand readily in the desired manner; whereas, the other air spring may be relatively stiff so that it will not expand properly but will fold and wrinkle in the mold. If a higher internal shaping pressure is used to overcome the resistance of the stiff air spring, the softer air spring may expand too much and become pinched between the mold sections as they come together.

Such difficulties are more evident in shaping air springs of the telescoping type. As mentioned above, the telescoping air springs are initially manufactured so that they take the form of a flared tube with a concavely curved portion adjacent the large bead. When such an unvulcanized air spring is shaped, this concavely flared portion must be reversed in curvature so that it will take the form of a convexly bulging convolution. The forces required to produce such a radical change in shape are relatively high and the success of the operation tends to be sensitive to variations in the internal pressure. When such air springs are shaped, the reversal of curvature must be accomplished in an early stage of the shaping operation, yet an air spring has an inherent resistance to a change in shape which is greatest at the beginning of a shaping operation. Accordingly, it will be appreciated that the initial stage of shaping is the most critical stage and that if this is successfully accomplished most of the difficulties of shaping and vulcanizing will have been obviated. Thus once the initial resistance of an air spring is overcome and once the reverse curvature has been produced, the forces required to expand the air spring further or to hold it in its expanded position are not critical. In other words, once the cords of an air spring have been induced to change their angle and their relative position and once substantial shear has taken place within the rubber in the wall of the air spring, the air spring will then tend to react uniformly to shaping pressures, and the forces required either to expand it further or to hold it in its expanded position are not critical.

The present invention takes advantage of the manner in which an air spring reacts to a change in shape by first introducing fluid under relatively high pressure into the interior of the air spring in a surge of relatively short duration to overcome the initial resistance of the air spring and to effect the required reversal in curvature of the wall of the air spring. This initial fluid pressure is so great that if it were maintained during the entire closing movement of the mold, it would over-expand the air spring and cause it to be pinched between the mold sections. Accordingly, as soon as the high pressure fluid has inflated the air spring out to about its maximum diameter, it is replaced by a lower fluid pressure which serves to hold the air spring at or very nearly at its fully expanded position. This enables the mold to be fully closed just before the air spring is expanded outwardly into contact with the molding surface. By the use of two fluid pressures, air springs can be molded independently of the variations in the stiffness and molding characteristics of individual air springs and air springs of a uniformly high quality can be produced. The invention is particularly useful where vulcanizing presses have two, four or more molds. In such a case, the initial relatively high internal pressure is sufficient to start the initial shaping of the most resistant of the air springs, but since it is applied for such a short time it will not over-expand the most easily shaped of the air springs then in the press.

Accordingly, it is a general object of the present invention to provide an improved method for shaping and vulcanizing air springs.

It is a more specific object to provide an improved method to shape and mold air springs of the telescoping type which comprises effecting the initial change in shape by compressing the air spring axially while subjecting the interior of the air spring to a relatively high fluid pressure in a surge of relatively short duration and thereafter continuing to compress the air spring axially while subjecting it to an internal fluid pressure substantially lower than the first pressure.

Yet, another object is to provide a method for shaping and vulcanizing air springs in which the air spring is initially expanded to a diameter about equal to the maximum diameter of the finished air spring, thereafter permitting it to shrink slightly in diameter as the air spring is further compressed axially, and finally expanding out to its full diameter against a confining mold.

These and further objects and advantages will be more fully apparent from the following description of a preferred form of the invention, reference being had to the accompanying drawings in which:

Figure 1 is a view in longitudinal section of the separate parts of an air spring mold shown in fully opened position and with an unvulcanized air spring in place ready for the molding operation;

Figure 2 is a view of the air spring and vulcanizing mold of Figure 1, with the mold closed just to the point where the large bead of the air spring is clamped and the air spring is about to undergo axial compression;

Figure 3 is a view similar to Figure 2 showing a later stage in the closing of the mold and illustrating how the internal fluid pressure has inflated the air spring outwardly, the air spring being shown at the stage of shaping in which the initial, relatively high, internal shaping pressure is about to be replaced by a lower internal fluid pressure;

Figure 4 is a view showing the mold and air spring of Figure 3 just before the mold is finally closed;

Figure 5 is a view similar to Figure 4 showing the mold fully closed with the air spring inflated into close contact with the molding surfaces; and Figure 6 is a view, partly in vertical section and on an enlarged scale, showing the finished air spring as it comes from the molding operation of Figures 1–5.

The invention is described, by way of example, in connection with the molding of a single convolution air spring which is best shown in Figure 6. The air spring which is indicated generally at 10, comprises a body 11 of two plies, 12 and 13, of rubberized fabric, the fabric being essentially weftless and having cords, which, in the unvulcanized air spring, initially extend at an angle of about 15° to the axis of the air spring. In the vulcanized air spring, the cord angles vary from 50°–55° maximum. The cords of one ply cross at an angle to the cords of the other. The ends of the plies 12 and 13 are wrapped about and anchored to a pair of circular steel rings 14 and 15, to form beads 16 and 17 respectively. The beads differ appreciably in diameter with bead 16 having an inside diameter of about 5 inches and bead 17 having an outside diameter of about 3 inches, to permit the required telescoping deflection of the air spring in service. In the present example, the small bead 16 is closed by a reinforcing metal cup 18 which fits snugly within the bead 16 and makes an air-tight fit with its inner diameter.

The air spring 10 is manufactured by first assembling the required components on a building drum, by methods similar to those used in building conventional air springs, to produce an unvulcanized preparation which is tubular in form, see Figure 1, having a substantially cylindrical body portion 21 which merges at one end with a concavely flaring portion 22 and at the other end with a short portion 23 of reduced diameter.

The mold for shaping and vulcanizing such an air spring comprises four separable mold parts, which are mounted on a vulcanizing press and which cooperate during the closing movement of the press to form the air spring into desired shape and which later totally confines it during the vulcanizing operation. These mold parts are: a top end section 25 which is affixed in a conventional manner to the ram (not shown) of the press, an intermediate mold section 26 which is also supported by conventional means to the ram of the press, a bottom mold section 27 which is fixed to the platen (also not shown) of the press and finally a plunger 28 which moves axially through a central bore 29 in the bottom mold section 27 and into cooperative engagement with the top mold section 25. The mold sections are hollow in construction so that steam or hot water can be circulated through them to keep them at the desired operating temperatures.

It should be mentioned that the intermediate mold section 26 is mounted on the ram of the press by a resilient connection which enables the top and intermediate mold sections to have relative movement during the closing of the press. Thus, the intermediate mold section 26 will first contact the bottom mold section and will then remain stationary as continued downward movement of the ram causes the top mold section 27 to move downwardly with respect to the intermediate and bottom mold sections until the mold is fully closed.

The top mold section 25 has a downwardly extending boss 30 which is recessed to receive the small bead 17 and its reinforcing metal cup 18, and to mold it in cooperation with the plunger 28. In order to support the metal cup and the small bead 17 for the molding operation, the plunger 28 has an enlarged head 31 which fits within the cup. The vertical movement of the plunger is preferably controlled in a conventional manner by a pneumatic cylinder (not shown) although of course its movement may be controlled by any suitable means.

The large bead 16 is molded between an annular grooved surface 32 in the bottom mold section and a complementary surface 33 in the intermediate mold section while the convolution wall of the air spring is shaped by suitably formed molding surfaces 34 and 35 in the top and intermediate mold sections respectively.

Initially the mold sections are spaced apart in about the relationship shown in Figure 1 with the top mold section 25 and intermediate section 26 raised from the bottom mold section 27 far enough to permit the unvulcanized air spring to be slipped over the plunger 28 which at that time is in its uppermost position.

When the ram descends to close the press, the intermediate mold section 26 and the top mold section 25, which are both supported by the ram, move downwardly together until the intermediate mold section clamps the large bead 17 against the bottom mold section. From this point on, the air spring and the bottom mold section 27 together form a fluid-tight enclosure. In the next instant the small bead 17 and the metal cup 18 are clamped between the top mold section 25 and the plunger head 31. This is the position of the mold as shown in Figure 2.

Up to this point, the sair spring has undergone virtually no change in shape but further closing movement of the press causes the top section 25 to compress the air spring in a manner which tends to produce an axial collapse of the air spring. Such collapse would result in folding and wrinkling of the air spring unless suitable means were taken to prevent this. Accordingly, as the air spring is compressed, air is introduced into the air spring at a pressure of about 20 pounds per square inch by means of a suitable conduit such as the passage 36 extending through the bottom mold section 27. The air inflates the air spring and causes it to bulge radially outwardly as the mold closes. When the mold has reached the position of Figure 3, the air pressure is reduced to a second pressure of about 10 pounds per square inch. This second pressure is maintained until the ram has completed its downward stroke and the mold is fully closed with the parts having the position shown in Figure 5, and with the air pressure forcing the air spring wall tightly against the molding surfaces 34 and 35. Steam under a pressure of 120–150 pounds per square inch is then forced into the air spring to vulcanize it in its final form.

The initial resistance of the unvulcanized air spring to the change in shape is attributable in large part to the reversal in curvature of the concavely flaring portion 22 of the unvulcanized air spring. The portion 22 must be inflated to take the form of a convexly bulging convolution, see portion 22a of the wall of Figure 6. The change in shape of this portion of the air spring is the most drastic change which occurs in the entire molding operation and the force required to produce such a change is appreciably higher than those required in the rest of the shaping operation. Such a change moreover must be coordinated with the axial compression of the air spring to prevent buckling of the air spring wall with the formation of folds and creases.

The initial change in curvature which takes place is indicated in Figure 2 in which the air spring is shown in solid lines just as the shaping operation begins and in which the reversed curvature is indicated by the dotted lines which show the air spring an instant after the internal fluid pressure is applied. After the initial change in shape which is indicated in Figure 2 occurs, the internal air pressure rapidly inflates the air spring to the shape shown in Figure 3 in which it will be noticed that the maximum diameter of the air spring is at about equal to the maximum diameter of the finished air spring but is still not so large as to be in danger of being pinched between the top mold section and the intermediate mold section. The condition of Figure 3 is reached about after one inch of the compression stroke of the press has taken place. Throughout this stage the first and higher of the two internal shaping pressures is imposed upon the air spring. If the air spring were subjected to this higher pressure for an appreciably longer period of time it would balloon out to an excessively large diameter. Accordingly, at this stage, the internal pressure is relieved from the initial pressure of about 20 pounds per square inch to the lower pressure of 10 pounds per square inch. The effect of such a reduction in pressure is to prevent further expansion of the air spring. As a matter of fact, the reduction in pressure, in many cases, permits the air spring to shrink to some extent and although the shrinkage is small, it is often noticeable to the eye. The air spring is subjected to this second pressure of 10 p.s.i., during the remainder of the closing stroke which is about another 8 inches of ram travel.

During this latter interval, the second pressure serves to hold the air spring in its inflated condition but it does not induce any appreciable radial expansion beyond that already produced by the first pressure. The second pressure is thus, in effect, a holding pressure serving merely to maintain the air spring in an inflated condition as the mold parts move together, see Figure 4. Just as the mold completely closes, the air spring wall is slightly out of contact with the surfaces of the mold sections but immediately after the closing of the mold, the second pressure is replaced by vulcanizing steam through passage 37, under a pressure of 150 pounds per square inch which insures forcible contact of the air spring wall throughout the extent of the mold surfaces.

The specific pressures of 20 pounds for the first pressure and 10 pounds for the second, holding pressure have been found to be suitable for an air spring having a two-ply body with a cord length of about 9 inches and with bead diameters of about 5 and 3 inches, as mentioned above. However, many factors will influence the actual values of the shaping pressures to be used. Air springs made of nylon cords will require different shaping pressures than those of rayon cords; other features of construction such as the composition and gauge of the rubber stocks, the shape of the unvulcanized air spring and the final shape of the finished air spring will all have an influence upon the internal pressures which are to be selected for a molding operation. The important feature of the invention is to select a first pressure which is sufficient to produce the required change in curvature and the subsequent inflation of the air spring to a maximum diameter and thereafter reduce that pressure substantially to a lower holding pressure which maintains the air spring in its inflated condition. The first inflating pressure which is selected must be high enough to break the air spring free from its unvulcanized shape and place it in an inflated condition ready for further shaping. Once an air spring has been so modified in shape, its forming and shaping characteristics will not vary appreciably from other air springs of the same nominal construction which have undergone the same shaping operation. Accordingly, when the holding pressure is imposed upon such air springs, they will tend to react uniformly and in a manner which enables careful control of the final portion of the shaping operation. In actual practice, it has been found that if two air springs inflate to different diameters in response to the initial shaping pressure they will nevertheless shrink back to about the same diameter when the holding pressure comes into effect. As a result, air springs of the type described can be mass produced in large quantities with a minimum number of air springs being rejected because of molding defects.

Various changes and modifications will no doubt occur to those skilled in the art without departing from the scope of the invention, the essential features of which are summarized in the appended claim.

I claim:

The method of vulcanizing an air spring having a convolution terminating in inextensible portions of different diameters with the smaller portion being capable of passing through the larger portion in a telescoping movement when the air spring is compressed in service, comprising the steps of supporting said air spring on the axially inner surface of said small diameter portion, clamping said large diameter portion, externally clamping said small diameter portion while supported, compressing said air spring axially to move said small and said large diameter portions axially relative each other, while subjecting the interior of said air spring to fluid under pressure, bulging said air spring body outwardly, and subjecting said air spring to vulcanizing temperatures and pressures while maintaining said air spring in said bulging condition.

References Cited in the file of this patent

UNITED STATES PATENTS

| | | |
|---|---|---|
| 1,563,519 | Otto | Dec. 1, 1925 |
| 2,221,470 | Brown | Nov. 12, 1940 |
| 2,814,072 | Soderquist | Nov. 26, 1957 |